United States Patent
Bekaert (10) Patent No.: US 8,977,480 B2
(45) Date of Patent: Mar. 10, 2015

(54) DETECTING LOCATION, TIMETABLE AND TRAVEL TIME ESTIMATIONS FOR BARRIER CROSSING IN A DIGITAL MAP

(75) Inventor: Tim Bekaert, Kluisbergen (BE)

(73) Assignee: TomTom Belgium N.V., Ghent (BE)

( * ) Notice: Subject to any disclaimer, the term of this patent is extended or adjusted under 35 U.S.C. 154(b) by 4 days.

(21) Appl. No.: 13/704,253

(22) PCT Filed: Jun. 15, 2010

(86) PCT No.: PCT/EP2010/058378
§ 371 (c)(1),
(2), (4) Date: Dec. 14, 2012

(87) PCT Pub. No.: WO2011/157288
PCT Pub. Date: Dec. 22, 2011

(65) Prior Publication Data
US 2013/0085659 A1    Apr. 4, 2013

(51) Int. Cl.
G08G 1/00      (2006.01)
G08G 9/00      (2006.01)
G01C 21/26     (2006.01)
G01C 21/32     (2006.01)
G08G 1/01      (2006.01)
G08G 1/0969    (2006.01)

(52) U.S. Cl.
CPC *G08G 9/00* (2013.01); *G01C 21/26* (2013.01); *G01C 21/32* (2013.01); *G08G 1/0104* (2013.01); *G08G 1/0129* (2013.01); *G08G 1/0969* (2013.01)
USPC ............................................ 701/118; 701/117

(58) Field of Classification Search
None
See application file for complete search history.

(56) References Cited

U.S. PATENT DOCUMENTS

| 3,185,959 | A  | * | 5/1965 | Barker | 340/934 |
| 6,304,821 | B1 | * | 10/2001 | Shimamoto | 701/423 |
| 8,144,032 | B2 | * | 3/2012 | Bogenberger et al. | 340/934 |
| 8,725,397 | B2 | * | 5/2014 | Hayashida et al. | 701/117 |
| 2004/0030670 | A1 | * | 2/2004 | Barton | 707/1 |
| 2005/0102098 | A1 | * | 5/2005 | Montealegre et al. | 701/209 |
| 2008/0054072 | A1 |   | 3/2008 | Katragadda et al. | |

(Continued)

FOREIGN PATENT DOCUMENTS

| JP | 2007114988 A  | 5/2007 |
| WO | 2007061734 A2 | 5/2007 |

(Continued)

OTHER PUBLICATIONS

International Search Report issued Mar. 28, 2011 for International Application No. PCT/EP2010/058378.

(Continued)

*Primary Examiner* — Helal A Algahaim
*Assistant Examiner* — Kelly E Darby (57) ABSTRACT

A method for determining barrier crossing information for convoyed objects (22) using historic trajectory data (28). Trajectories (28) having similar geographical and directional properties are bundled so that trajectory density can be measured as a function of position and time (s, t). Visual presentation of the trajectory information can be used to determine certain types of barrier crossing information useful in a digital map. Frequency analysis on a number of trajectory density time series may be performed to determine specific barrier crossing locations (26) through the detection of vehicle bursts. Such frequency analysis may also indicate barrier crossing times and schedules in the case of crossing patterns.

7 Claims, 10 Drawing Sheets

(56) References Cited

U.S. PATENT DOCUMENTS

2009/0216442 A1    8/2009    Luert
2011/0077857 A1*    3/2011    Ramaswamy et al. ........ 701/204

FOREIGN PATENT DOCUMENTS

WO      2008110321 A1    9/2008
WO      2011033886 A1    3/2011

OTHER PUBLICATIONS

Yu Zheng, Quannan Li, Yukun Chen, Xing Xie, Wei-Ying Ma: "Understanding Mobility Based on GPS Data", ProceedingUBICOMP '08 Proceedings of the 10th International Conference on Ubiquitous Computing, 2008, pp. 312-321, XP002625572, New York, NY, USA the whole document.

* cited by examiner

FIG. 11

DETECTING LOCATION, TIMETABLE AND TRAVEL TIME ESTIMATIONS FOR BARRIER CROSSING IN A DIGITAL MAP

CROSS-REFERENCES TO RELATED APPLICATIONS

This application is the National Stage of International Application No. PCT/EP2010/058378, filed Jun. 15, 2010, and designating the United States. The entire content of this application is incorporated herein by reference.

BACKGROUND OF THE INVENTION

1. Field of the Invention

This invention relates to digital maps of the type for displaying road or pathway information, and more particularly toward a method for determining barrier crossing schedules, crossing times and/or locations for convoyed objects such as motor vehicles transported by ferry boat.

2. Related Art

Personal navigation devices utilize digital maps combined with accurate positioning data from GPS or other data streams. Digital maps can also be accessed by personal computers, mobile devices, and other systems. These devices have been developed for many applications, such as navigation assistance for automobile drivers. The effectiveness of these navigation systems is inherently dependent upon the accuracy of digital maps stored in its memory or otherwise accessed through a suitable database connection such as wireless signal, cable, telephone line, etc.

Figure 1:
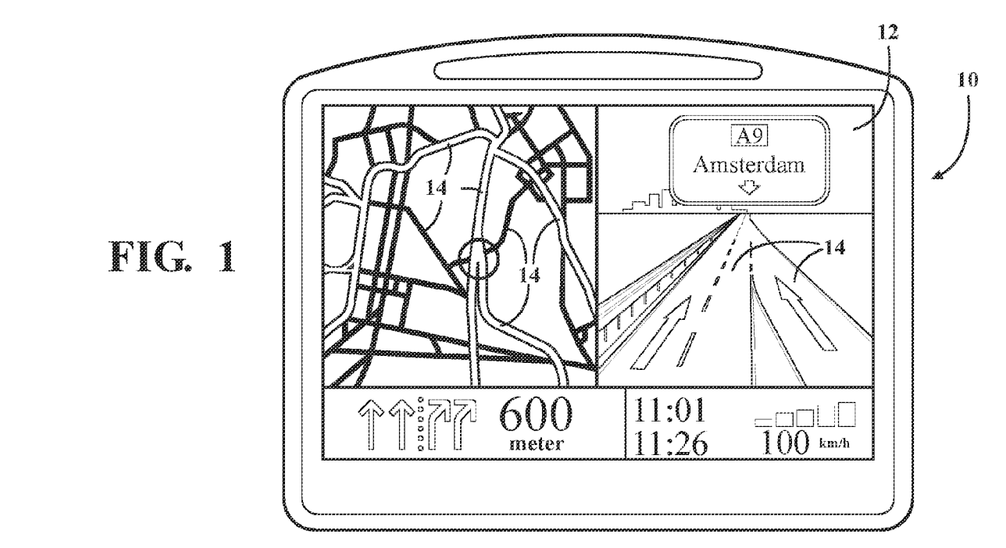
FIG. 1 is an exemplary view of a portable navigation device according to one embodiment of this invention including a display screen for presenting map data information.

The navigation system 10 shown in FIG. 1 includes a display screen 12 portraying a portion of a stored digital map as a network of roads 14. A traveler having access to a GPS-enabled navigation device 10 may then be generally located on the digital map close to or with regard to a particular road 14 or segment thereof. Some GPS-enabled navigation devices 10, like several models manufactured by TomTom NV (www.tomtom.com), may also be configured as probes to passively generate geo-position measurement points at regular (or sometimes irregular) intervals. These recordings are sometimes referred to as trajectory data and comprise a sequence of geo-coded positions recorded at intervals of, for example, two seconds. Of course, other suitable devices may be used to generate trajectory data including, for example, handheld devices, mobile phones, and the like. Thus, trajectory data may be described as a set of information about the movement of a vehicle (or a person carrying a probe) which contains time-stamped geographic locations (xyz coordinates) and possibly also metadata (vehicle speed, receiver type, vehicle type, etc.).

It is known to take collections of probe measurements for the purpose of incrementally creating and/or updating digital maps. The trajectory data thus produced can be transmitted either on-the-fly or subsequently to a collection service or other map data analysis service via wireless (e.g., cellular) transmission, via internet uploads, or by other convenient methods. Internet uploads may be synchronized to occur in conjunction with digital map updates which navigation device users might obtain as a service. From the collection of trajectory data, road geometries can be inferred and other features and attributes derived by appropriate analytical methods.

A typical collection of trajectory data from a plurality of probes traversing a particular section of a digital map over an extended period of time may contain billions of discrete data points, each geo-coded and time stamped. Probe traces collected over time can be grouped or bundled according to those which match to a common area of the digital map and then overlaid for interpretation by map database editors. Editors use various mathematic and statistical techniques to determine or infer road geometries, compute speed profiles, acceleration profiles, direction of travel, altitude, detect changes in road networks, to compare two road networks, and many other specifications.

Digital map providers continuously strive to improve and update their maps. Inaccurate data, for example, may be unsuitable to compute optimal routes in response to a navigation query, or to provide other reliable information to a traveler. Inaccurate or incomplete information contained in a digital map can result in poor or erroneous navigation instructions and lead to undesirable navigation decisions.

Navigation decisions must take into account natural features of the landscape which present barriers to travel. For example, a river represents a constraint to vehicular travel, as well as to pedestrian and bicycle travel. Typically, a river may be crossed only with the aid of a ferry, bridge or tunnel. The existence or nonexistence of a bridge, ferry or tunnel constitutes an important detail to be recorded in a digital map. Likewise, the average speed over which vehicles have historically crossed a barrier is also an important detail for digital maps.

In the case of some barrier features, which include not only water barriers but also railroad crossings and many other barrier types, it may be common to congregate vehicles or other movable objects and then periodically transport them in convoy across the barrier to the other side. For motor vehicles crossing a water barrier, a ferry boat may transport a group of motor vehicles across the water barrier on a fairly predictable time schedule. Other barrier crossing scenarios will be recognizable by those of skill in the art where vehicles or other objects are moved in convoy across the barrier in a regular recurring manner.

Detecting barrier crossing locations, such as ferry crossings, by simply matching trajectories to a preexisting water map or digital road map is not effective when the digital map does not recognize a ferry crossing in the first place. It is likewise not effective when the digital map (e.g., the water map) is not sufficiently accurate. Techniques have been proposed for detecting groups of moving objects and trajectories using computationally expensive methods that cluster large numbers of trajectories based on distance measures. For example, one such method is proposed in the work "Discovery of Convoys in Trajectory Databases" by H. Jeung, et al., Proceedings of the VLDB Endowment, Volume I, Issue 1 (August 2008), Session: Spatial and Motion Data, pages 1068-1080 (ISSN: 2150-8097). Such methods, however, are shown to be ineffective at finding convoys—that is of finding groups of objects that have moved together for a period of time. Furthermore, the techniques available in the prior art do not exploit the repetitive day-to-day nature of certain types of barrier crossings such as ferry boats and other controlled crossing locations so as to detect these well defined and perhaps least complex types of convoys and then to extrapolate departure timetables and crossing frequencies.

Accordingly, there is a need in the art to mine historic trajectory data to identify certain types of barrier crossings such as ferry boats and the like, wherein conveyed objects (such as vehicles) are periodically and predictably escorted across a barrier.

SUMMARY OF THE INVENTION

The invention relates to methods for determining barrier crossing information for convoyed objects using historic trajectory data. The method enables collected trajectory data to be evaluated in regard to barrier crossing schedules, crossing times and/or departure locations. The method of this invention includes a digital map having first and second road segments separated from one another by a barrier. The separation distance between the first and second road segments comprises a barrier arc length. Trajectories are recorded over time from a plurality of objects crossing the barrier between the first and second road segments. Each trajectory comprises sequential geo-position and time stamp data. Recorded trajectories with similar geographical and directional properties are bundled together. The density of the bundle is measured as a function of position and time recordings. According to this invention, barrier crossing information can then be determined for convoyed objects based on the measured changes in the trajectory density of the bundle. The barrier crossing information includes at least one of the following: a departure location, a crossing timetable, a crossing frequency, a crossing travel time and a crossing speed.

The principles of this invention can be used to effectively locate barrier crossings, such as ferry crossings, railroad crossings and certain lift bridge crossings for example, where none currently exist within a digital map. Furthermore, crossing schedules or timetables can be derived from the measured changes in trajectory density, as well as crossing frequency information and crossing time details, all of which can be highly valuable for navigation and routing purposes.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the figures wherein like numerals indicate like or corresponding parts throughout the several views, this invention pertains to digital maps as used by navigation systems, as well as other map applications which may include those viewable through internet enabled computers, personal digital assistants (PDAs), cellular phones, portable navigation devices, in-dash car mounted navigation systems, and the like.

Figure 2:
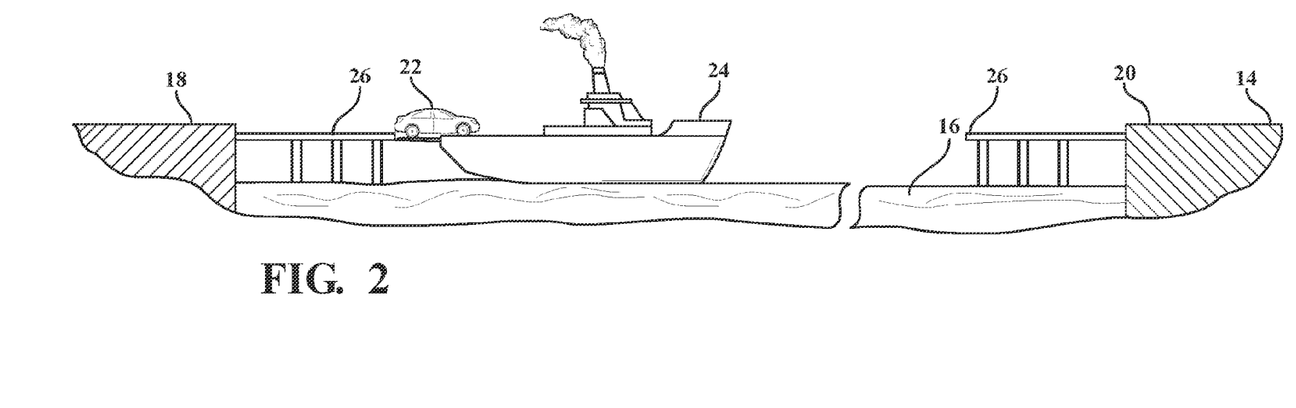
FIG. 2 is a highly simplified elevation view of a water barrier with a ferry service linking a road segment on one side to a road segment on the other side of the barrier.

FIG. 2 depicts, in highly simplified form, a water barrier in the form of a river, lake or sea 16. This water barrier 16 is merely an example of one type of traffic barrier; non-water type barriers are also contemplated within the broad definition of barrier and may include valleys, railroad crossings, construction/repair projects, and other features which periodically impede or restrict the free flow of motor vehicles or other convoyed objects along a roadway or other traveled path. First 18 and second 20 road segments comprise those portions of an overall road network 14 contained in a digital map, but specifically located on adjoining sides of a barrier 16. Typically, the road segments 18, 20 will be of the type capable of supporting vehicular traffic flow, although the principles of this invention are equally applicable to bicycle and pedestrian paths, as well as other travel paths along which any object may be transported. An automobile 22 is shown entering a ferry 24 for passage across the barrier 16 to the second road segment 20. The ferry 24 represents a mode of transportation for the automobiles 22 across the barrier 16 in a group or convoy. However, the ferry 24 is but one example used in barrier crossing situations. In some cases, a motor vehicle 22 may cross a barrier under its own power. For example, in the case of drawbridges, vehicles 22 will congregate on one of the road segments 18, 20 when the drawbridge is up, and then proceed across the barrier 16 as a convoy (at least initially) under their own power when the drawbridge is lowered.

Figure 3:
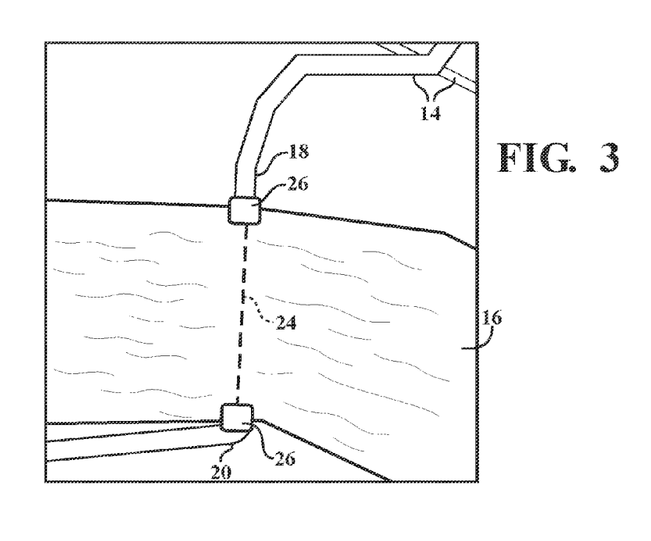
FIG. 3 is a view of a digital map indicating a ferry crossing joining road segments on either side of a water barrier.
Figure 4:
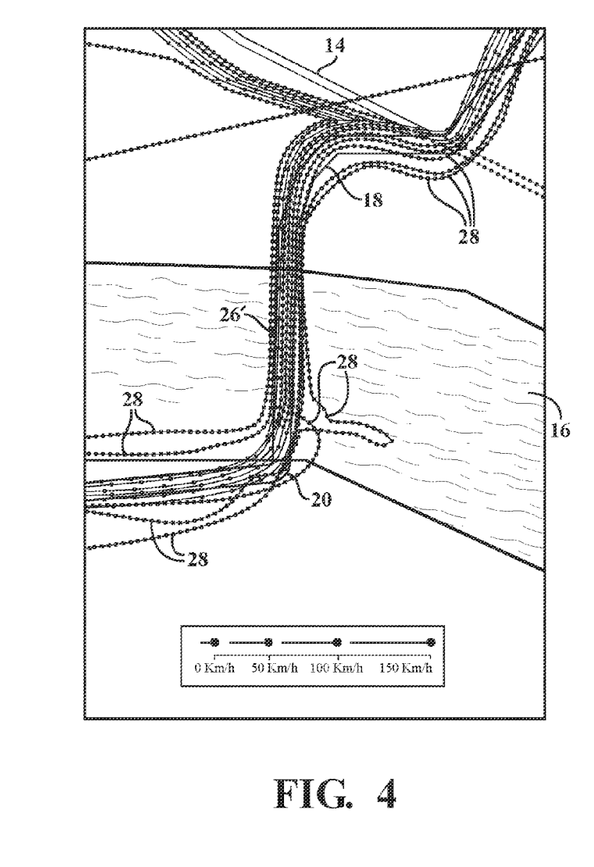
FIG. 4 is a view as in FIG. 3 superimposed with trajectory information from collected probe data such as may be used in connection with the methods of this invention.

FIG. 3 represents a depiction from an exemplary digital map wherein first 18 and second 20 road segments are separated from one another by a barrier 16 which, in this instance, is a river. The broken line 24 represents a ferry crossing in this example. The separation distance between the first 18 and second 20 road segments comprises a barrier arc length (L). The end points 26 of the barrier crossing represent, in this case, ferry departure locations which connect, respectively, to the first 18 and second 20 road segments. Thus, vehicles embark and disembark from the ferry 24 at the end points 26. Over time, trajectories 28 from a plurality of vehicles 22 crossing the barrier 16 can be collected using, for example, the probe recording techniques described above. As a simplified example, FIG. 4 shows a sampling of superimposed trajectory data 28 over the digital map image of FIG. 3. Such trajectories 28 may represent vehicles crossing from the first 18 to the second 20 road segment or conversely from the second road segment 20 to the first road segment 18.

Figure 5:
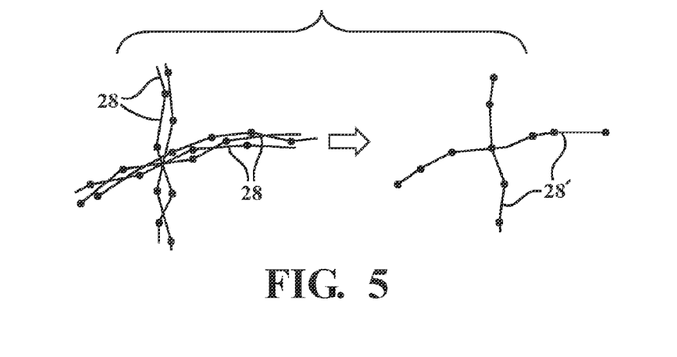
FIG. 5 describes one manner in which recorded trajectories having similar geographic and directional properties may be bundled together for purposes of subsequent analysis.

It is advantageous for the purposes of this invention to bundle together trajectories 28 that have similar geographical and directional properties. Trajectories 28 which cross from the first road segment 18 to the second road segment 20 (i.e., Southerly) over the barrier 16 may be bundled together. Likewise, all trajectories 28 collected over time that travel in a Northerly direction across the barrier 16 (i.e., from the second road segment 20 to the first road segment 18) may also be bundled together. FIG. 5 shows how the bundling of trajectories 28 may occur. The left-hand side of FIG. 5 shows, for example, several trajectories 28 traveling in an East-West direction and several trajectories 28 traveling in a North-South direction. For bundling purposes, all of the trajectories which travel in the same direction are grouped together and resolved to a bundle 28' as shown in the right-hand side of FIG. 5. Numerous alternative methods can be used to accomplish the bundling of trajectories 28. That is, the trajectories 28 can be clustered in several different ways. In one example, a single representative trajectory 28 is selected as the bundle 28'. In another technique, bundling may be accomplished by using a preexisting geometry as a bundle selected by matching the trajectories 28 to a preexisting digital map. In yet another method, a suitable averaging algorithm may be used to derive the bundles 28'. Regardless of the particular technique selected, the bundles 28' represent the features that will be subsequently analyzed for crossing information. More specifically, the portion or lengths of the bundles which correspond to a barrier crossing can be appropriately labeled. Once labeled, the individual trajectories 28 contained within (or represented by) the bundle 28' can also be labeled with barrier crossing information in the form of attributes.

Figure 6A:
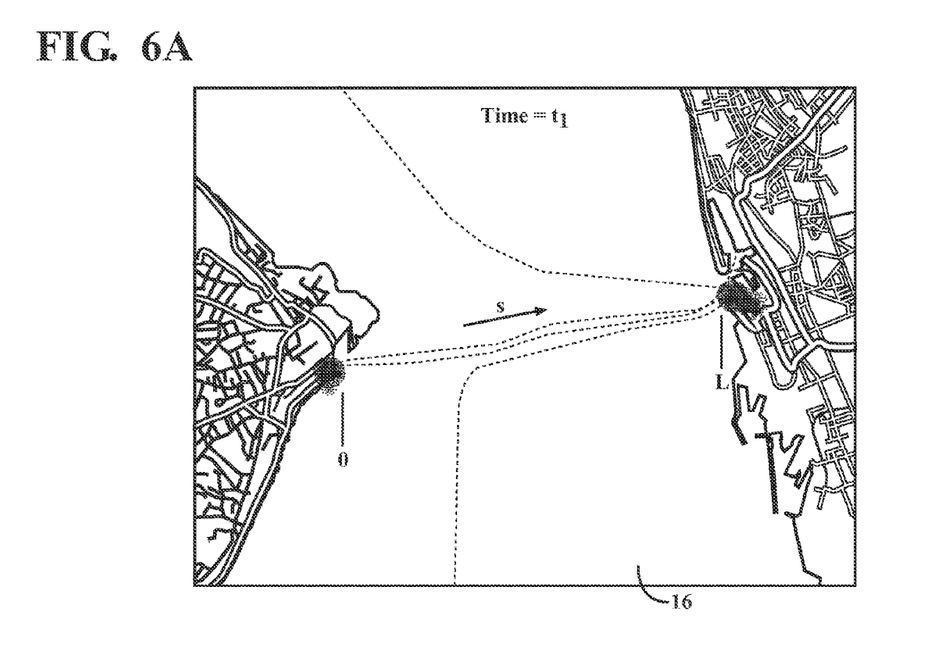
FIGS. 6A-H depict a time sequence (t1-t8) at a barrier crossing location, from which the typical behavior of convoyed objects can be observed as large numbers of objects at a similar location at the same time.
Figure 6B:
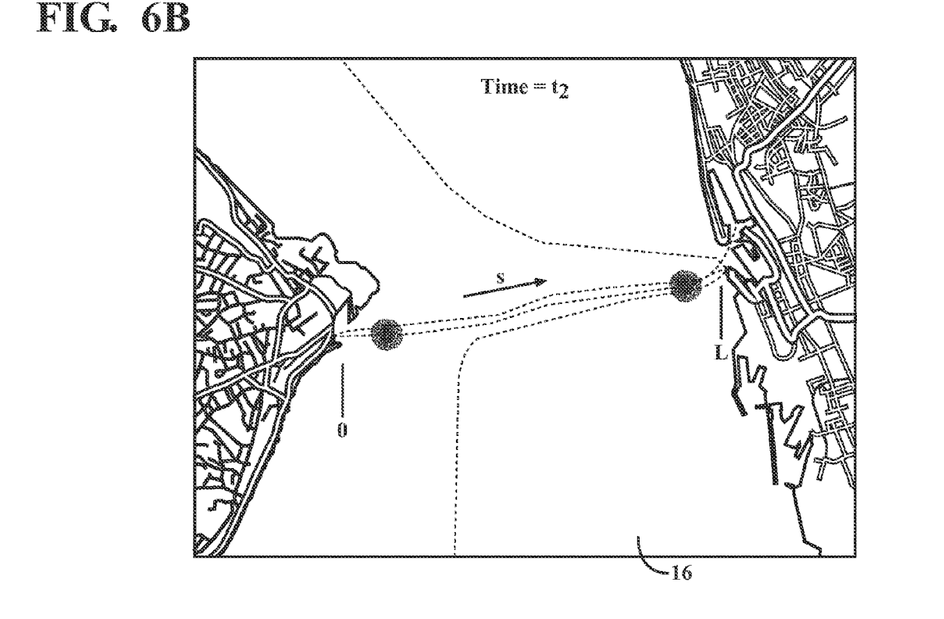

As stated previously, each trajectory comprises a sequence of geo-position and time stamp recordings representing the movement of an object 22 (such as a vehicle) along a roadway 14. A trajectory 28 represents the trace of these position and time recordings for each vehicle 22. A bundle 28', in turn, represents a collection of trajectories 28 over time having similar geographical and directional properties. FIG. 6A shows an exemplary section from a digital map wherein a water barrier 16 separates first 18 and second 20 road segments on opposite sides of a large water feature. If the trajectory bundles 28' are viewed in a single time slice, e.g., time t1, the collection of geo-position recordings represented by each respective trajectory 28 may appear something as a cluster or cloud of data points shown here congregated about the departure points or end points 26 of the respective road segments 18, 20. This depiction typifies automobiles as they are loaded onto ferry boats located on opposite sides of the water barrier 16. At time t2, as shown in FIG. 6B, the respective ferry boats will have departed for the opposite shore. The grouped data points indicate individual position recordings for vehicles 22 (not shown) as they are transported on the respective ferry boats. In these figures, any location along the trajectory bundles 28' is represented by the letter s, with the distance or arc length of the barrier crossing (contained within the bundle 28') being represented by the letter L.

Figure 6C:
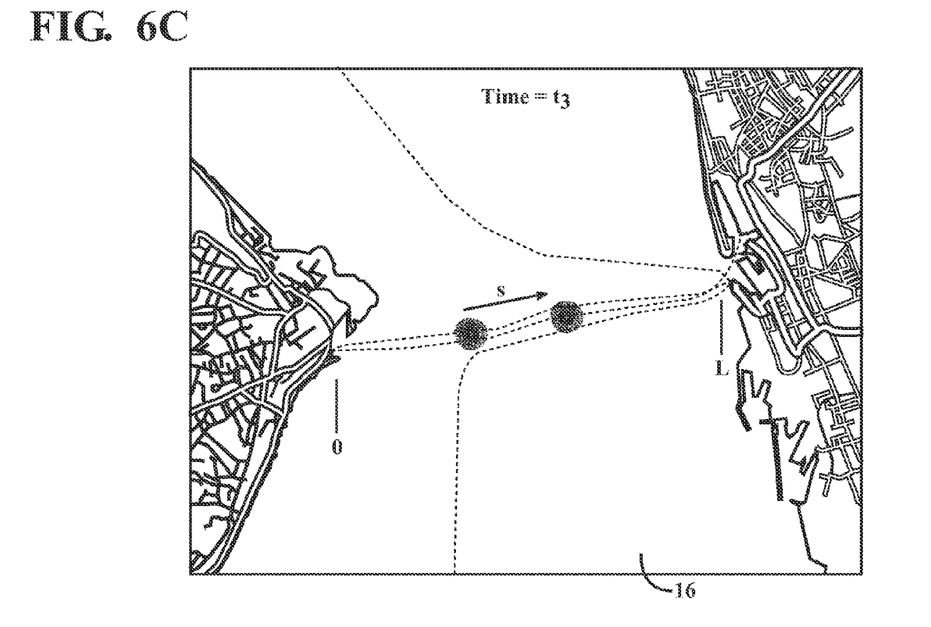
Figure 6D:
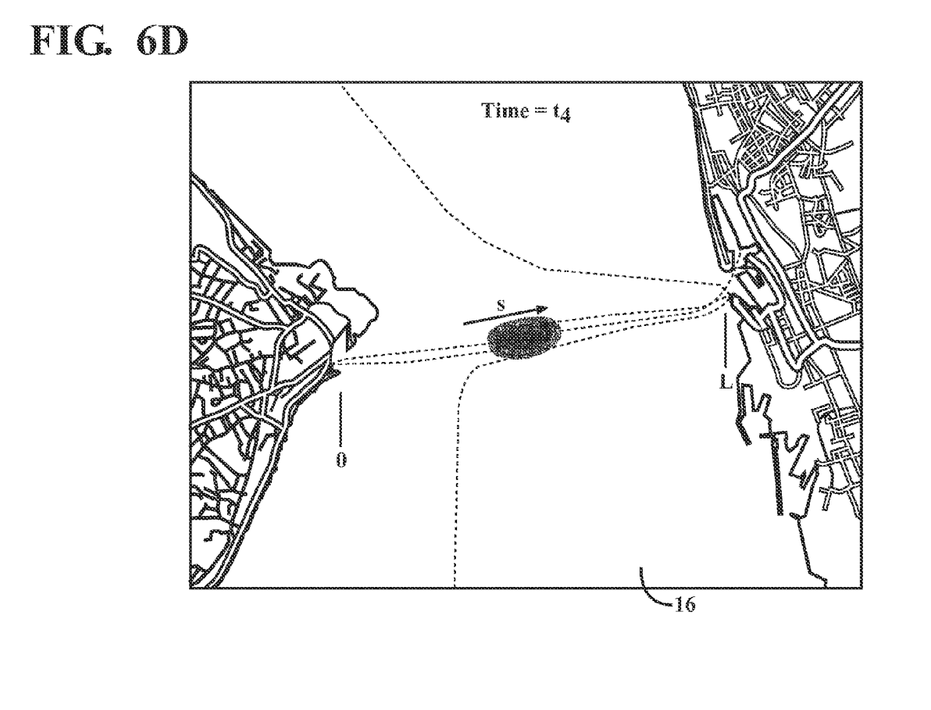
Figure 6E:
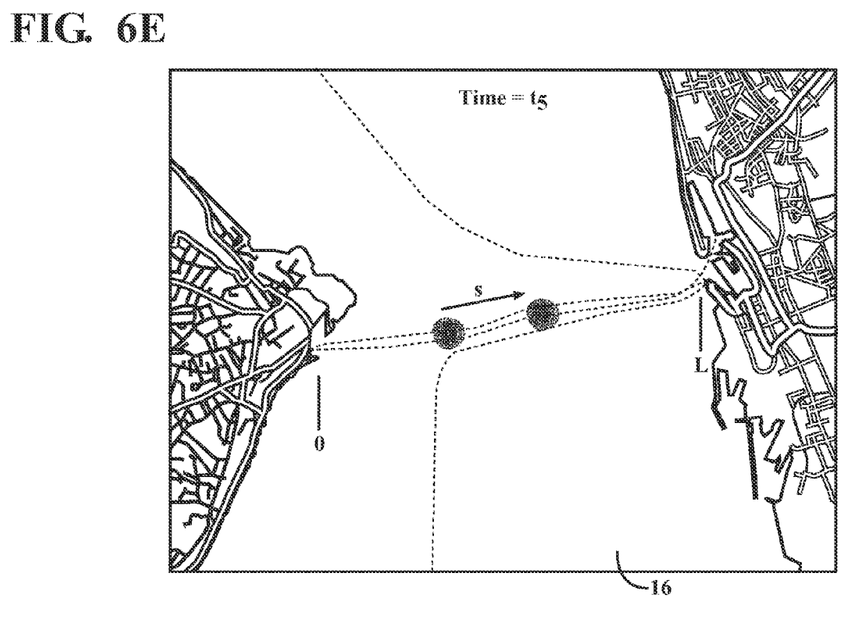
Figure 6F:
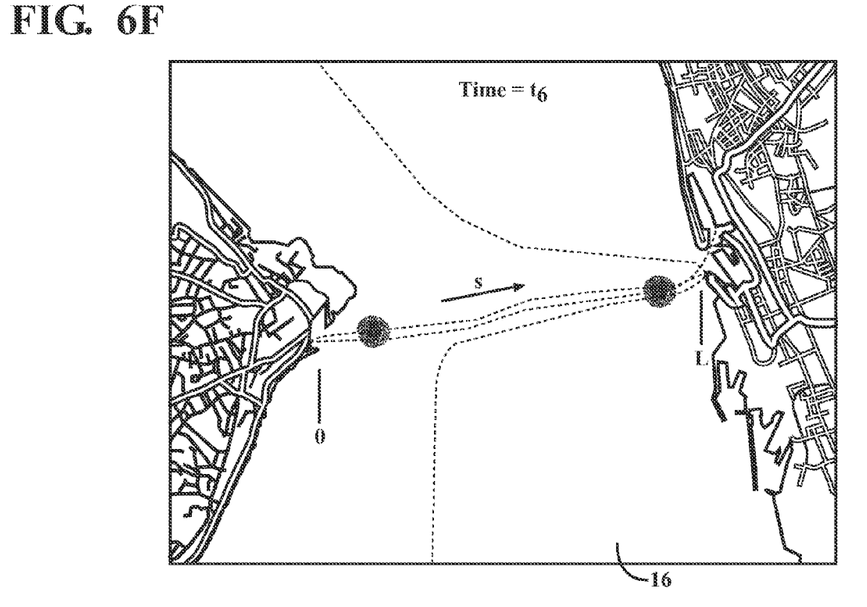
Figure 6G:
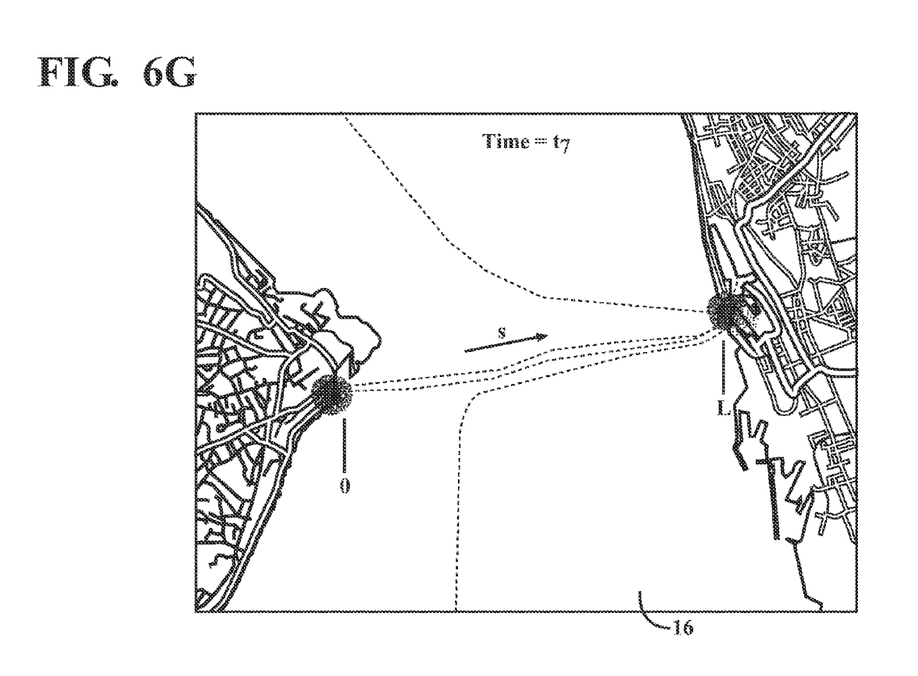
Figure 6H:
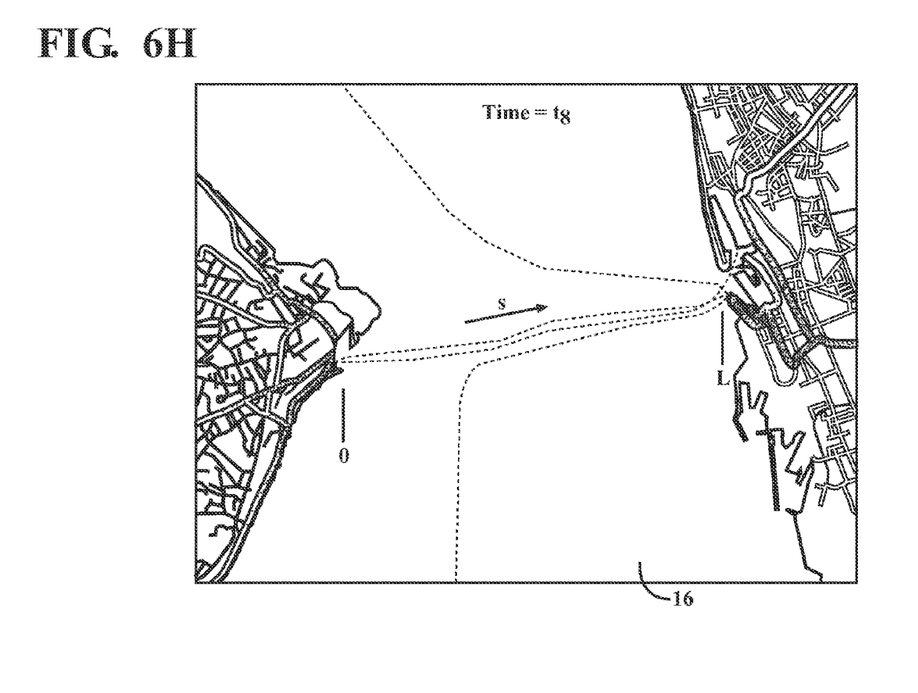

FIG. 6C represents a time slice t3 subsequent to time t2 (FIG. 6B) and showing the respective data points contained in trajectory bundles 28' progressively further in their movement toward the other side of the barrier 16. FIG. 6D is taken at time t4 at the point where the two ferry boats pass one another with their respective data points appearing in close proximity. FIGS. 6E and 6F describe respective time slices at t5 and t6 showing further movement of the convoyed objects 22. In FIG. 6G, the ferry boats have reached the opposite shore and the vehicles 22 begin to disembark. At time t8, as shown in FIG. 6H, the vehicles have departed from the respective ferry docks, and have begun traveling away along the various road segments. Accordingly, sea ferries 24 as described in the preceding examples can be shown to exhibit a very typical behavior in that they group large numbers of vehicles 22 at a similar location at the same time, while at other times there are no to few vehicles 22 on the ferry routes. Furthermore, ferry crossings as well as many other types of barrier crossing systems often show repetitive behavior across days, making this behavior even more apparent when trajectories 28 are accumulated across a number of days. On conventional roadways, on the other hand, moving vehicles 22 are more dispersed in time and place, even considering repetitive traffic congestion.

Figure 7:
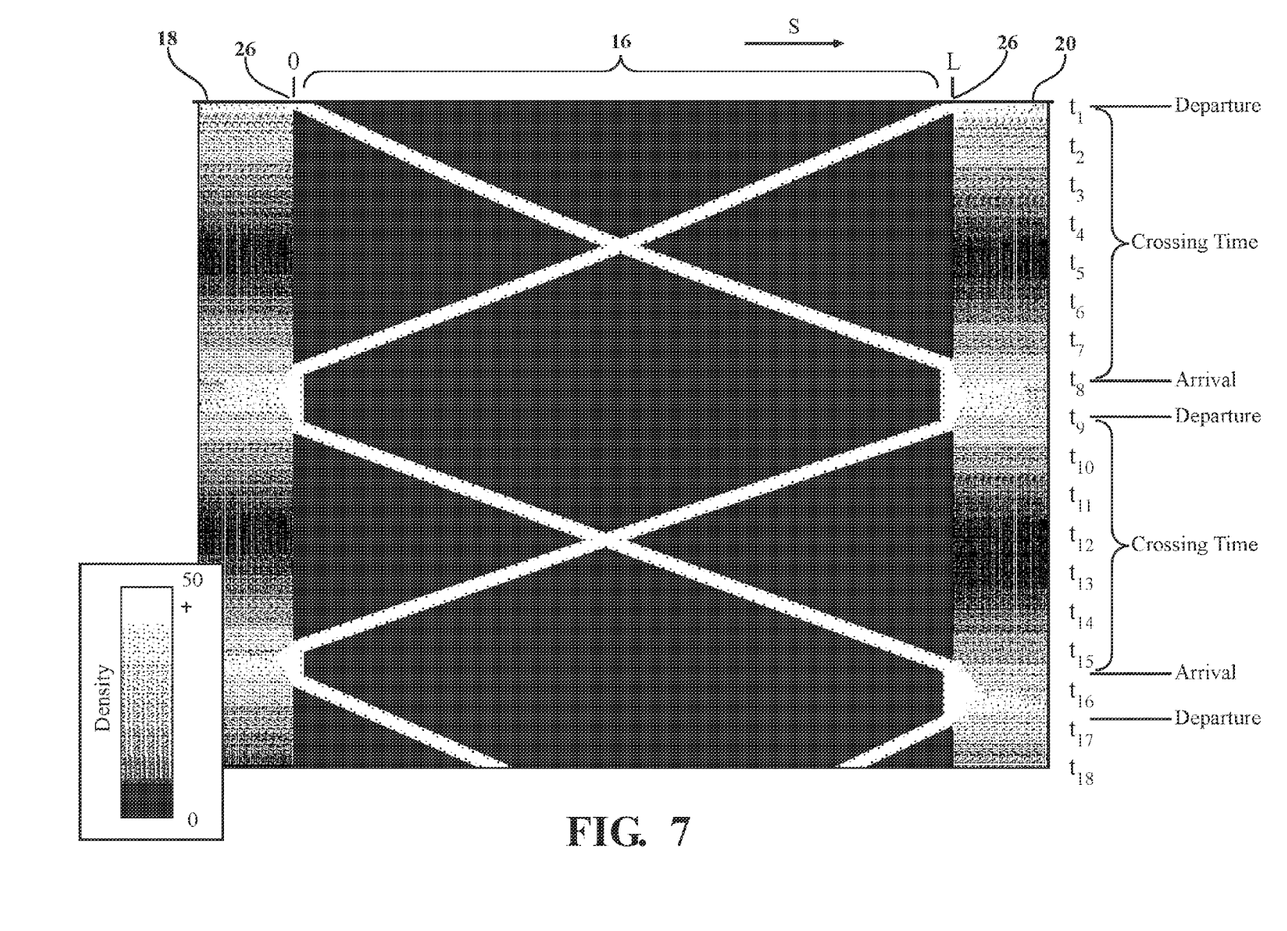
FIG. 7 is an example of a location-time (s, t) diagram for the exemplary ferry crossing in FIGS. 6A-H over a selected time schedule t1-t16 and in which trajectory densities are indicated by gray-scale intensity.

The repetitive behavior for many types of barrier crossings can be described by measuring the trajectory density of the bundle 28' as a function of position and time. The term density here refers to the number of individual trajectory 28 data points contained in a bundle 28' at a particular location (s) and time (t). Alternatively, the term density could refer to the number of individual traces 28 at a particular location (s) and time (t). FIG. 7 shows a sample location-time (s, t) diagram corresponding to the example in FIGS. 6A-H. Trajectory densities are here depicted in terms of intensity according to a gray scale legend. In other words, when the number of data points or trajectories passing a particular location and time is greater than 50 (a number arbitrarily selected for this example), a maximum intensity or white color is indicated. Conversely, when no data points or trajectory data is contained at a particular point s at a particular time t along the arc length of the barrier 16, a black color intensity is indicated. Thus, at any one of the time slices represented in FIGS. 6A-H, high intensity trace points would appear to correspond with the clustering or grouping of the constituent data points shown. As can be seen here, cars 22 arrive and depart more or less constantly from the first 18 and second 20 road segments as represented by the generally smooth gray values for all time (t). However, the ferry crossings are clearly discernable, with no cars 22 at some points in time and all the cars identifiable at other points in time. This is the striking difference between the black and white intensity images for certain time slices. If such an intensity diagram were extrapolated over the course of an entire day, it would be apparent that more traffic appears during the day where highest intensity is revealed. At roll on/roll off locations 26, vehicles drive slowly and thus account for a larger intensity for all time t adjacent the end points 26 of the barrier crossing. Note however that if the density is derived from the number of traces rather than data points, a larger intensity for all time t adjacent the end points 26 of the barrier crossing may not be apparent. From such an intensity diagram, it is possible to directly identify the location of a convoy crossing, as well as a crossing timetable, i.e., departure schedule, crossing frequency and even crossing travel time. For example, travel time in this example may be taken as the time span between t1 and t8, or between t8 and t15, etc. This is the time between departure of the ferry from one road segment and its arrival at the other road segment on the opposite side of the barrier 16.

Figure 8:
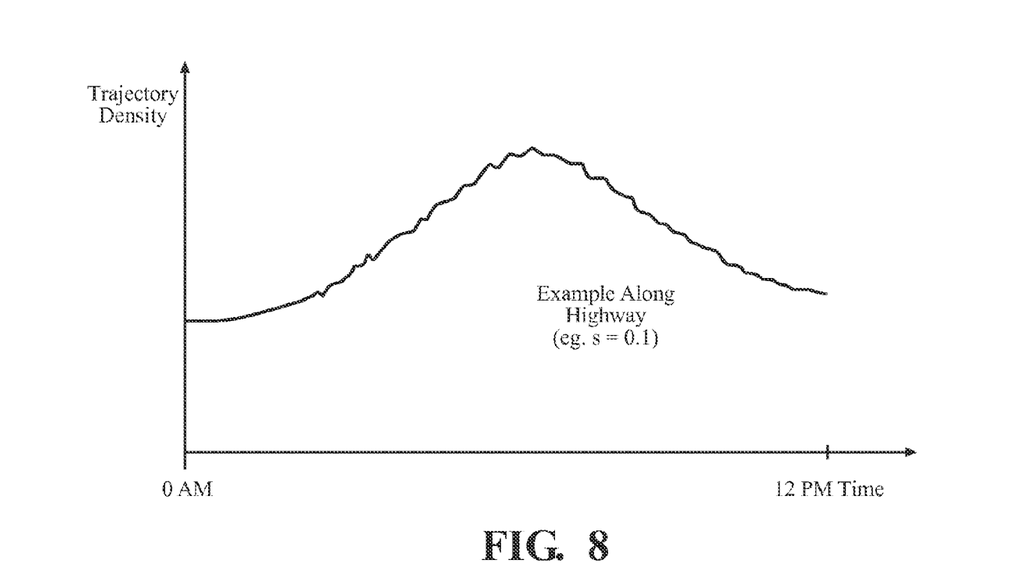
FIG. 8 is an exemplary time series plotting trajectory density versus time for an exemplary location along a highway.
Figure 9:
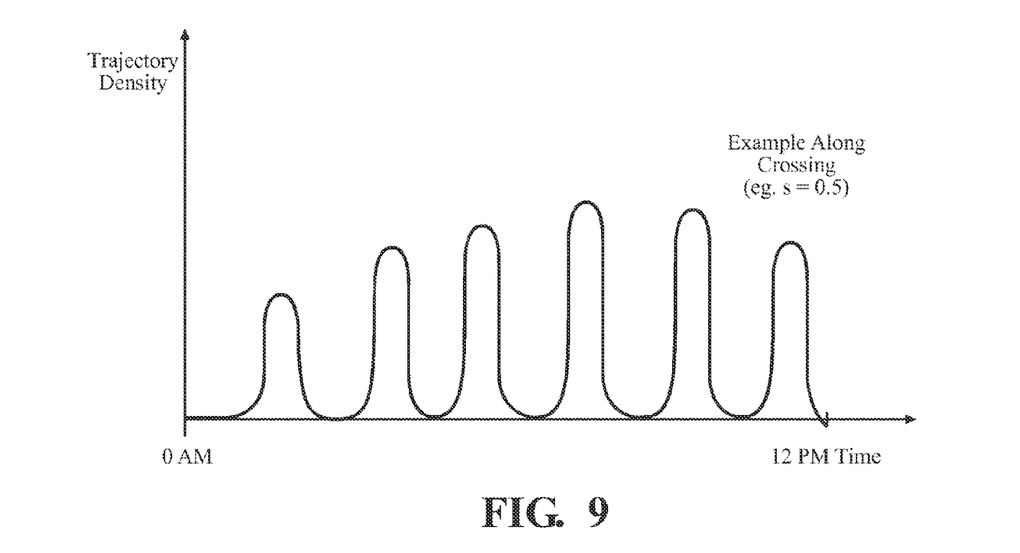
FIG. 9 is a density versus time diagram as in FIG. 8 but for an exemplary position along a ferry crossing such as shown in FIGS. 6A-H.

Referring now to FIGS. 8 and 9, changes in bundle density may be plotted over time to reveal important information to digital map editors. FIG. 8 represents data collected from vehicles traveling along an exemplary roadway such as may be found on a primary or secondary road in the road network 14. Bundle density will typically gradually increase during peak traffic hours, and gradually settle into lower densities during less traveled times. However, FIG. 9 represents an exemplary location along the bundle 28' from which abrupt vehicle bursts can be easily observed. Such vehicle bursts comprise sharp, repetitive changes in density occurring periodically throughout the day. These abrupt density changes from zero to substantially greater than zero indicate a convoy crossing such as for the ferry boat described in the preceding examples. By analyzing the cyclic frequency of changes in the trajectory density of the bundle 28' over time, useful analyses can be made for the purpose of enhancing a digital map.

Figure 10A:
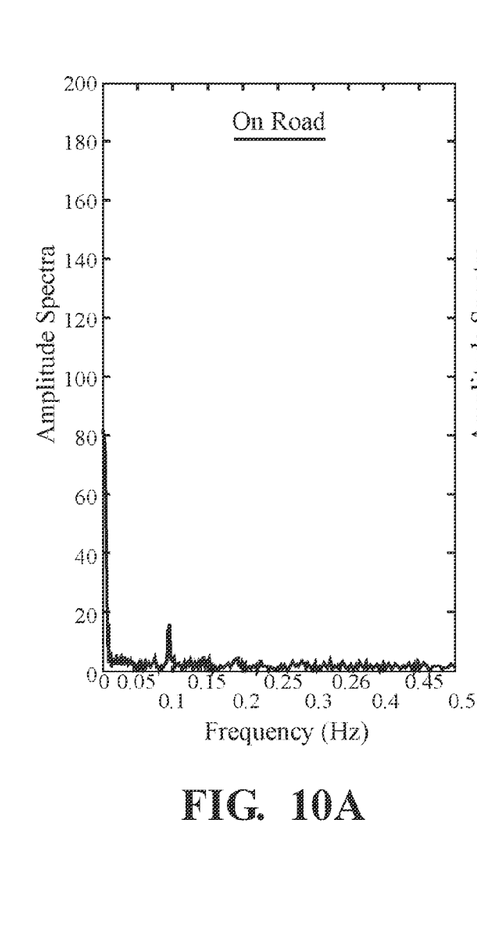
FIGS. 10A-C provide frequency analysis diagrams showing amplitude spectra versus frequency for locations on a highway (FIG. 10A), at the crossing end point, i.e., departure point (FIG. 10B), and along a crossing (FIG. 10C)
Figure 10B:
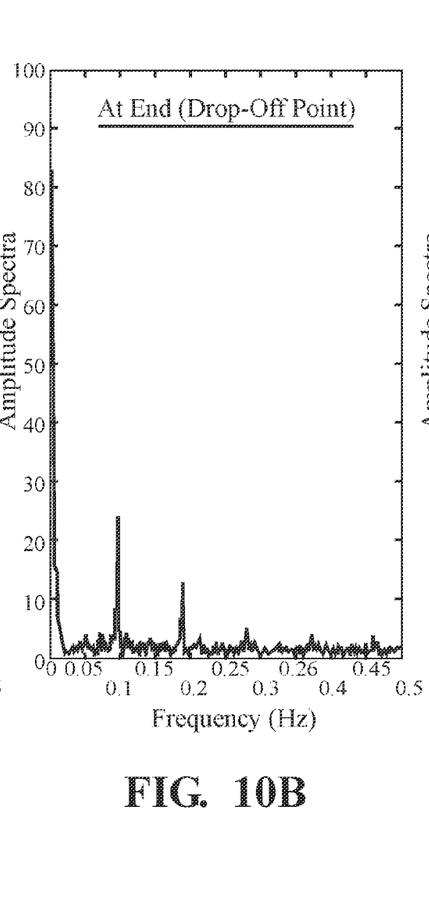
Figure 10C:
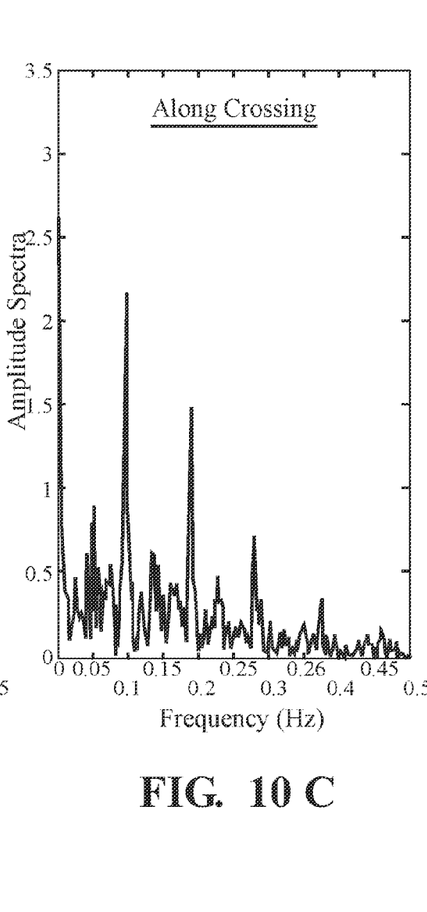

As can be seen by comparison of FIGS. 8 and 9, roads on which the moving object (i.e., vehicle) density changes slowly during the day have mainly low frequency components, which means that the trajectory density in the time series curve changes slowly. This will be true even for daily, repetitive congestion situations. However, bundles 28' on which the vehicle density at a particular location changes abruptly from zero to substantially more than zero several times a day, i.e., vehicle bursts, will have at least one significant large frequency component. The results of this type of frequency analysis on a time series can be visualized in frequency diagrams or amplitude spectra like that shown in FIGS. 10A-C. Frequency peaks in the amplitude spectra (apart from the DC component at approximately 0 Hz) will correspond with barrier crossing frequencies. Thus, FIG. 10A represents a collection of trajectory data over an open road segment showing little to no appreciable frequency peaks. However, frequency peaks at approximately 0.1 and 0.2 Hz are identifiable at a drop off or end point 26 as shown in FIG. 10B. FIG. 10C represents a point (s) along the barrier crossing from which large frequency peaks in the amplitude spectra can be observed. Based on the shape of the frequency distributions, a decision can then be made on the ferry crossing character of the trajectories at that point (s) of the bundle 28'.

Figure 11:
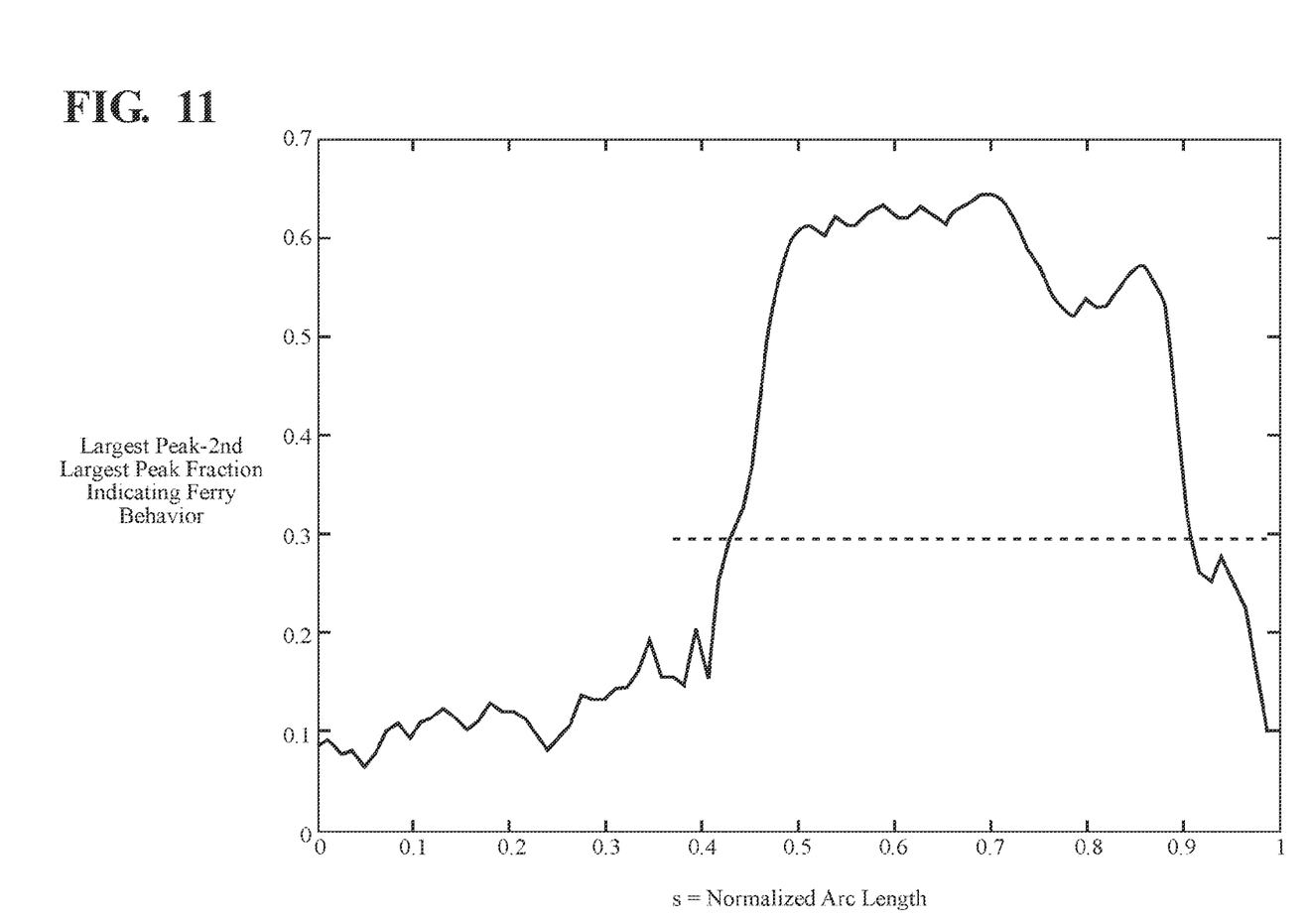
FIG. 11 is a plot along the arc length of the bundle for the purposes of identifying end points, i.e., departure points, for the barrier crossing by establishing a threshold criterion C equal to the ratio between the two highest frequency peaks.

Various criteria can be devised to make this decision. As one example, which is graphically depicted in FIG. 11, the criteria C used can be the ratio between the two highest frequency peaks as represented by the formula:

$$C = A(v_1)/A(v_0)$$

where $v_0$=the frequency of the highest peak in amplitude spectrum $v_1$=the frequency of the second highest peak in the amplitude spectrum, and $A(v)$=the absolute value of the amplitude in the amplitude spectrum of the frequency v Using this methodology, roads with smooth traffic increases should have criteria C values in the range of 0 and in any event substantially less than 1. However, ferry crossings and other barrier crossing methodologies over which convoyed objects 22 are moved should have criteria C values much larger and closer to a value of 1. A threshold may be set for the value C to determine the location (s) along a bundle which corresponds to a barrier crossing. In this example, a threshold value of 0.3 is chosen and is represented by the broken horizontal line in FIG. 11. At the intersections of the broken horizontal line (i.e., the threshold value 0.3) and the criteria C graph in FIG. 11, end points 26 may be identified at the (normalized) arc length positions of approximately s=0.4, 0.9. Above the threshold, a barrier crossing is inferred; below the threshold road segments 18, 20 are inferred. As suggested previously, however, this particular technique for determining a C value for the ratio between the two highest amplitude frequency peaks is but one approach to discern ferry crossing behaviors. Furthermore, a number of expansions can be advanced to improve this decision, for example by making the decision for crossing locations dependent upon the frequency distribution shape on other locations in the vicinity of s. Those of skill in the art will appreciate other techniques as well.

The frequency of convoy departures across a barrier, e.g., indicating how often a ferry sails, can be read directly from the amplitude spectrum of FIG. 9, or from the intensity diagram of FIG. 7. When using the amplitude spectrum of FIG. 9, if a large peak exists at a frequency $v_1$, then this means there is a periodic significant increase of trajectory density every $t1=1/v_1(s)$, meaning the ferry sails every t1(s). Of course, a frequency analysis can be done for each type of day (e.g., Mondays on winter months, Sundays, etc.) allowing departure timetables to be determined for different days, parts of the year, periods of operation, etc. This enables a digital map to be augmented with these attributes and thus provide a highly valuable information source for navigation and route planning purposes.

From the location-time (s, t) trajectory diagram of FIG. 7, the travel time and travel distance of a ferry crossing can be determined. To use the context of previous examples, a ferry crossing will appear as a high density line connecting a point (s1, t1) and (s2, t2). The travel time is then (t2−t1), and the travel distance is (s2−s1). Travel time thus calculated can be used also for navigation and routing purposes. Furthermore, if travel time and travel distance are both known, the average crossing speed can be directly computed as: v=(s2−s1)/(t2−t1). In some cases, the average crossing speed (v) of the convoy of objects 22 may be useful.

Accordingly, using the methods of this invention, trajectory information can be visualized along a bundle 28' in a location-time (s, t) diagram to assess trajectory densities or activity for certain locations during certain time periods (e.g., work days vs. holidays, etc.). The specific application of frequency analysis as described above can be performed on a number of trajectory time series to determine ferry crossing locations by detecting vehicle bursts on possible locations. That is, the sudden presence of a large amount of moving vehicles on locations where otherwise no vehicles are present may be discerned readily by the frequency analysis techniques. Furthermore, the specific application of these frequency analysis techniques on trajectory density time series for specific locations can be used to determine ferry departure timetables as well as ferry sailing frequencies and other types of convoy crossing situations.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for determining barrier crossing information using historic trajectory data, said method comprising the steps of:

receiving trajectory data representative of the movements of a plurality of objects over a network of travel paths with respect to time, said trajectory data for an object comprising a plurality of sequential time-stamped geopositions, and said network of travel paths comprising at least one barrier crossing which periodically impedes or restricts the free flow of objects along the network of travel paths;

associating the received trajectory data with segments of a digital map, said segments being representative of the network of travel paths;

determining the trajectory density along at least some of the segments as a function of position and time from the trajectory data, the trajectory density being indicative of the number of objects at a particular location and time;

identifying locations at which the trajectory density changes periodically from zero to substantially greater than zero;

using a frequency distribution for the trajectory density changes at said identified locations to determine the location of a barrier crossing and augmenting the digital map with the determined location of the barrier crossing, the barrier crossing being between a first segment and a second segment;

determining at least one of a crossing timetable or crossing frequency for the barrier crossing from the changes in trajectory density; and associating the determined at least one of the crossing timetable or crossing frequency with the barrier crossing in the digital map.

2. The method according to claim 1, further including bundling trajectory data from a plurality of objects having similar geographical and directional properties, and associating the one or more bundles with segments of the digital map.

3. The method according to claim 1, further including determining at least one of a crossing travel time and an average crossing speed for the barrier crossing from the changes in trajectory density.

4. The method according to claim 1, wherein said step of using the frequency distribution for the trajectory density changes at said identified locations to determine the location of a barrier crossing includes establishing a threshold criterion (C) equal to the ratio between the two highest frequency peaks of the frequency distribution of trajectory density changes as expressed by the formula:

$$C=A(v_1)/A(v_0)$$

where: $V_0$=frequency of highest peak in amplitude spectrum $V_1$=frequency of 2nd highest peak in amplitude spectrum $A(v)$=|amplitude| in amplitude spectrum of frequency v.

5. The method according to claim 4, wherein the threshold criterion (C) is 0.3.

6. The method according to claim 1, wherein said step of determining a crossing frequency for the barrier crossing from the changes in trajectory density includes making separate frequency determinations for work days and non-work days.

7. The method according to claim 1, further including the step of determining crossing timetables for different days.

* * * * *